United States Patent
Huang

(10) Patent No.: US 10,641,306 B2
(45) Date of Patent: May 5, 2020

(54) FIXING BOLT

(71) Applicant: Chun Yen Huang, Taichung (TW)

(72) Inventor: Chun Yen Huang, Taichung (TW)

(*) Notice: Subject to any disclaimer, the term of this patent is extended or adjusted under 35 U.S.C. 154(b) by 0 days.

(21) Appl. No.: 15/448,601

(22) Filed: Mar. 3, 2017

(65) Prior Publication Data
US 2018/0252251 A1 Sep. 6, 2018

(51) Int. Cl.
F16B 13/06 (2006.01)
F16B 13/12 (2006.01)
F16B 15/06 (2006.01)

(52) U.S. Cl.
CPC ............ F16B 13/124 (2013.01); F16B 15/06 (2013.01)

(58) Field of Classification Search
CPC ...... F16B 13/02; F16B 13/04; F16B 13/0816; F16B 13/0891; F16B 13/12
USPC ........................... 411/57.1, 50.5, 50.6, 71, 73
See application file for complete search history.

(56) References Cited

U.S. PATENT DOCUMENTS

| | | | | | |
|---|---|---|---|---|---|
| 1,116,545 A | * | 11/1914 | Barrett | ................. | F16B 13/124 411/68 |
| 1,288,177 A | * | 12/1918 | Pleister | ................. | F16B 13/124 411/80.6 |
| 1,396,569 A | * | 11/1921 | Girvan | ................. | F16B 13/122 411/61 |
| 1,646,431 A | * | 10/1927 | Tomkinson | ............. | F16B 13/12 411/19 |
| 1,993,749 A | * | 3/1935 | Pleister | ................. | F16B 1/0891 411/76 |
| 2,240,716 A | * | 5/1941 | Pleister | ................. | F16B 13/124 411/68 |
| 3,232,163 A | * | 2/1966 | Croessant | ............. | F16B 13/124 411/73 |
| 3,516,324 A | * | 6/1970 | Berner | .................... | F16B 13/02 411/72 |
| 4,360,301 A | * | 11/1982 | Mosberger | ............ | F16B 13/124 411/80.5 |
| 4,662,808 A | * | 5/1987 | Camilleri | ................ | F16B 13/12 411/340 |
| 5,993,129 A | * | 11/1999 | Sato | ...................... | F16B 13/124 411/43 |
| 2004/0240960 A1 | * | 12/2004 | Daly | ..................... | F16B 13/001 411/16 |
| 2009/0220316 A1 | * | 9/2009 | Burger | .................. | F16B 13/001 411/39 |

* cited by examiner

Primary Examiner — Gary W Estremsky

(57) ABSTRACT

A fixing bolt contains: a flexible sleeve and a locking nail. The flexible sleeve is provided with an internal threaded section above a conical hole, multiple-annular protrusions, and multiple projected wings. Furthermore, the flexible sleeve defines a plurality of slits to communicate with the conical hole, and extend across the multiple annular protrusions to be joined at a central axis of the flexible sleeve, below the conical hole, so that a lower portion of the flexible sleeve is formed into a plurality of paws. The locking nail includes an external threaded section configured to be in threaded engagement with the internal threaded section of the flexible sleeve, a driving head, and a forcing section. Furthermore, the forcing section of the locking nail includes a cylindrical portion and a conical portion to facilitate expanding or retracting the paws of the flexible sleeve, thus anchoring or de-anchoring the flexible sleeve.

3 Claims, 6 Drawing Sheets

FIXING BOLT

FIELD OF THE INVENTION

The present invention relates to a fixing bolt, which can detachably fix an object onto a wall or structure.

BACKGROUND OF THE INVENTION

Referring to FIG. 7, a conventional fixing bolt contains locking stem 90, a flexible sleeve 91, an adjustable tube 92, and two nuts 93. The locking stem 90 has a first outer threaded section 900 configured to be in threaded engagement with an inner threaded section of the flexible sleeve 91, and the flexible sleeve 91 has a second outer threaded section 910 configured to be in threaded engagement with an inner threaded section of the adjustable tube 92. The locking stem 90 has a first end extending out of the adjustable tube 92 and has a second end screwed with the two nuts 92, wherein the two nuts 93 are movably screwed with the locking stem 90 against the flexible sleeve 91.

Referring to FIG. 8, a wrench (not shown) can be used to fit over a hexagonal head 911 of the flexible sleeve 91 to have the locking stem 90 turned in a direction such that the locking stem 90 is moved back, wherein a forcing wedge 901 of the locking stem 90 forces retaining paws 912 on a front end of the flexible sleeve 91 to expand outwardly, such that the retaining paws 912 can be urged against an inner surface of the bore 94 in which the fixing holt is located. Thereafter, the adjustable tube 92 can be further driven into the bore 94 by using a wrench fitted over a hexagonal head 920 thereof and turning the wrench, thus locking the conventional fixing bolt in the bore 94. On the other hand, the locking stem 90, the flexible sleeve 91, and the adjustable tube 92 can be operated in a reverse order, so that they can be removed from the bore 94.

However, the conventional fixing bolt is complicated and difficult to be removed from the corresponding bore.

Accordingly, there is a need to provide a fixing bolt that can mitigate and/or obviate the afore-described disadvantages.

SUMMARY OF THE INVENTION

One object of the present invention is to provide a fixing bolt which is simplified so as to reduce the manufacture cost.

Another object of the present invention is to provide a fixing bolt which can fix a workpiece on the wall quickly and easily.

A further object of the present invention is to provide a fixing bolt which can be removed from the wall conveniently.

To achieve the above objects, a fixing bolt provided by the present invention contains: a flexible sleeve and a locking nail.

The flexible sleeve defines a passage that runs through an upper portion of the flexible sleeve and terminates at a conical hole located at a lower portion of the flexible sleeve and tapering into a point, wherein an internal threaded section is formed on an inner surface of the sleeve that defines the passage, above the conical hole, multiple annular protrusions are formed on the lower portion of the flexible sleeve, multiple projected wings are formed on the upper portion of the flexible sleeve, and a plurality of slits are defined at the lower portion of the flexible sleeve to communicate with the conical hole of the passage, and extend across the multiple annular protrusions to be joined at a central axis of the flexible sleeve, below the conical hole, so that the lower portion of the flexible sleeve is formed into a plurality of paws, which are divided by the slits 3.

The locking nail includes an external threaded section configured to be in threaded engagement with the internal threaded section of the flexible sleeve, a driving head formed on a first end of the locking nail, and a forcing section formed on a second end of the locking nail, wherein the forcing section includes a cylindrical portion immediately following the external threaded section, and a conical portion immediately following the cylindrical portion, and the forcing section is configured to have a length less than each of the slits.

Preferably, the conical portion of the forcing section of the locking nail has a conical face and a tip formed at a distal end of the forcing section, such that when the locking nail is rotated, the forcing section moves into or from the conical hole of the flexible sleeve so as to outwardly expand or inwardly retract the paws of the flexible sleeve.

DETAILED DESCRIPTION OF THE FIRST EMBODIMENTS

Figure 1:
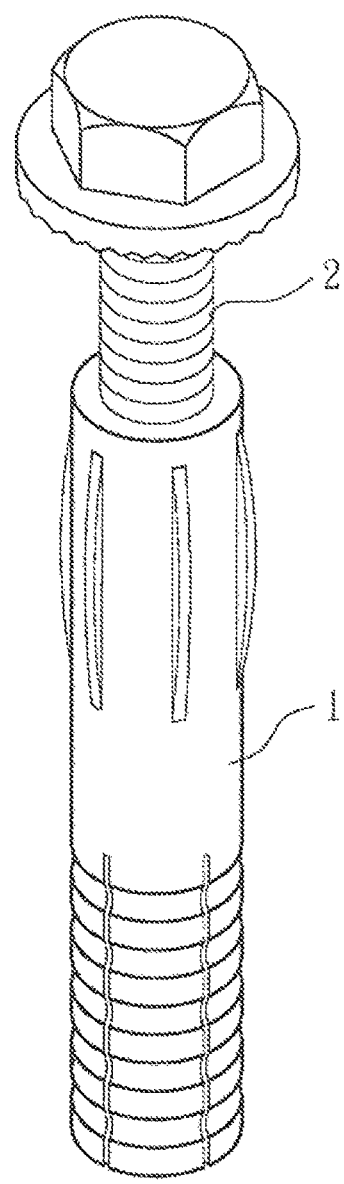
FIG. 1 is a perspective view of a fixing bolt according to a preferred embodiment of the present invention.

With reference to FIG. 1, a fixing bolt according to a preferred embodiment of the present invention is shown, which can fix a workpiece 3 on a wall (see FIG. 3), and the fixing bolt comprises: a flexible sleeve 1 and a locking nail 2.

Figure 2:
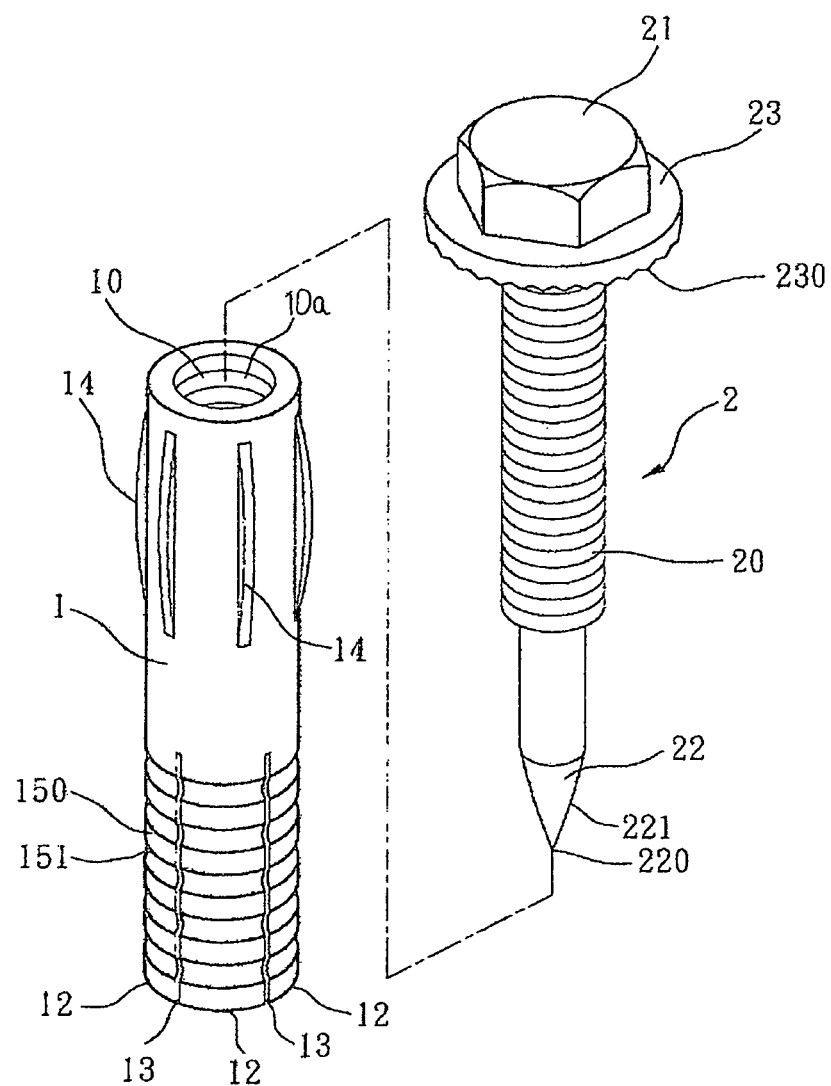
FIG. 2 is a perspective view showing exploded components of the fixing bolt according to the preferred embodiment of the present invention.
Figure 3:
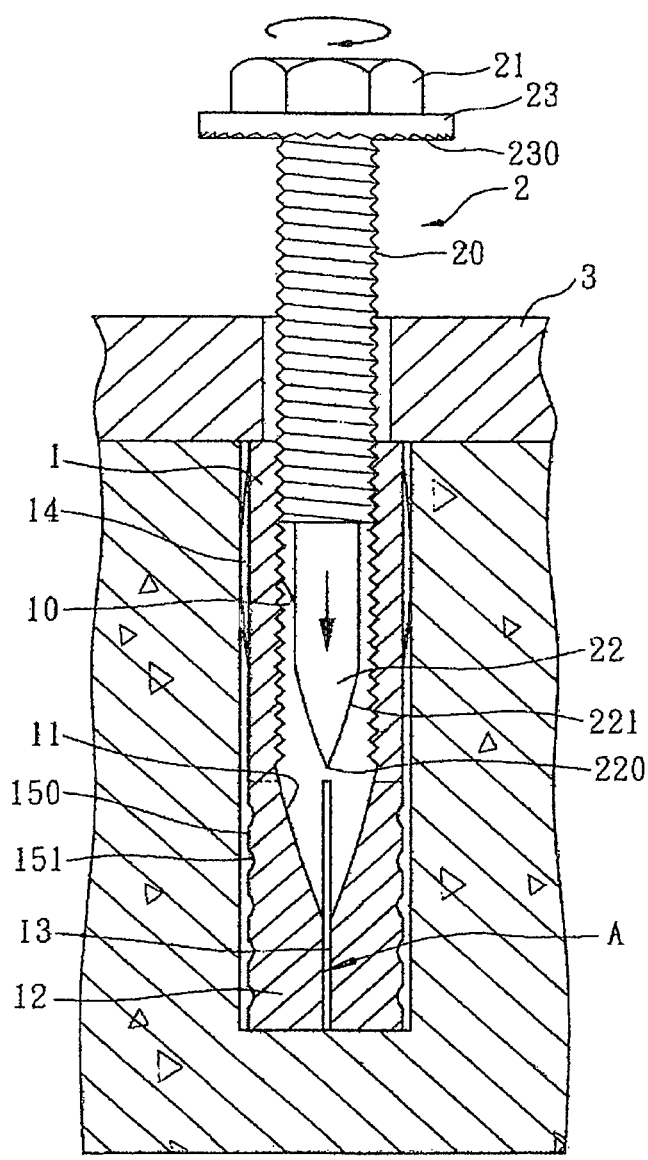
FIG. 3 is a cross sectional view of the fixing bolt according to the preferred embodiment of the present invention.

Referring further to FIGS. 2 and 3, the flexible sleeve 1 is hollow, and the flexible sleeve 1 defines a passage 10a that run through an upper portion of the flexible sleeve 1 and terminates at a conical hole 11, which is located at a lower portion of the flexible sleeve 1 and tapers into a point located at a central axis of the flexible sleeve 1, wherein an internal threaded section 10 is formed on an inner surface of the sleeve that defines the passage 10a, above the conical hole 11; multiple annular protrusions 150 are formed on the lower portion of the flexible sleeve 1 (it is noticed that an indentation 151 is located between two adjacent protrusions 150). A plurality of slits 13 are defined at the lower portion of the flexible sleeve 1 to communicate with the conical hole 11 of the passage 10a, and extend across the multiple annular protrusions 150 to be joined at a location (A) that is below the conical hole 11 and coaxial with the central axis of the flexible sleeve 1. As such, the lower portion of the flexible sleeve 1 is formed into a plurality of paws 12, which are divided by the slits 13

The flexible sleeve 1 further has multiple projected wings 14 formed on the upper portion thereof.

The locking nail 2 includes an external threaded section 20 configured to be in threaded engagement with the internal threaded section 10 of the flexible sleeve 1. The locking nail 2 further includes a driving head 21 formed on a first end thereof and includes a forcing section 22 formed on a second end of the locking nail 2, wherein the forcing section 22 includes a cylindrical portion immediately following the external threaded section 20, and a conical portion 22 immediately following the cylindrical portion. The forcing section 22 is configured to have a length less than each of the slits 13, so that the locking nail 2 does not extend out of the flexible sleeve 1 when the locking nail 2 is fully engaged with the flexible sleeve 1 (see FIG. 5). The conical portion has a conical face 221 tapering into a tip 220 at a distal end of the forcing section 22, such that when the locking nail 2 is rotated, the forcing section 22 moves into or from the conical hole 11 of the flexible sleeve 1 so as to outwardly expand or inwardly retract the paws 12, thus anchoring or de-anchoring the flexible sleeve 1.

The driving head 21 has a circular stop tab 23 formed on a bottom thereof, and the circular stop tab 23 has a rugged surface 230 formed on a bottom thereof, such that the friction between the workpiece 3 and the tab 23 can be increased to prevent unwanted rotation of the locking nail 2.

Figure 4:
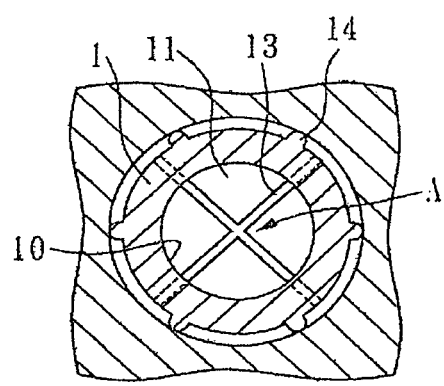
FIG. 4 is another cross sectional view of the fixing bolt according to the preferred embodiment of the present invention.

As shown in FIG. 3, in operation, the flexible sleeve 1 is inserted into a bore of the wall so that the multiple projected wings 14 of the flexible sleeve 1 contact with the bore (as illustrated in FIGS. 3 and 4), hence the flexible sleeve 1 does not revolve as the locking nail 2 is rotated.

Figure 5:
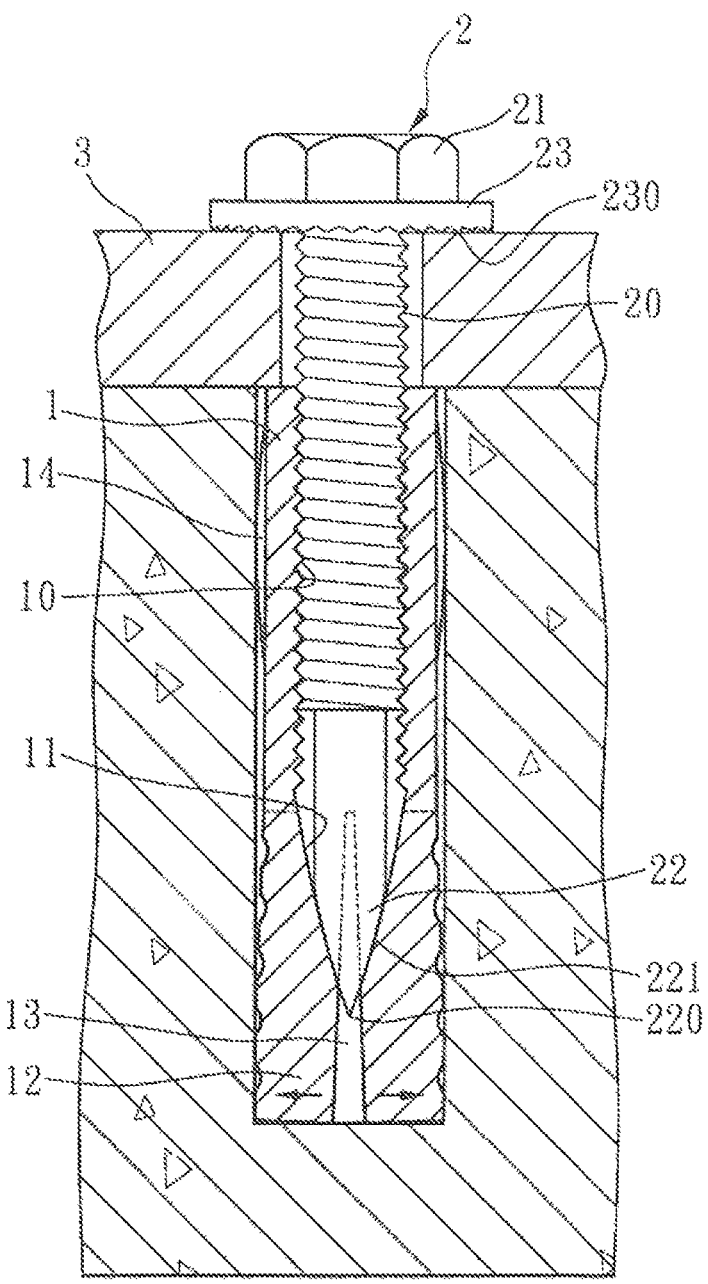
FIG. 5 is a cross sectional view of the fixing bolt according to the preferred embodiment of the present invention, wherein the fixing bolt has been installed into a bore.

With reference to FIG. 5, after the flexible sleeve 1 is secured in the bore of the wall, a hand tool can be used to fit over the driving head 21 to rotate the locking nail 2, the external threaded section 20 of the locking nail 2 can be in threaded engagement with the internal threaded section 10 of the flexible sleeve 1, and the forcing section 22 of the locking nail 2 can be driven into the conical hole 11 of the flexible sleeve 1. As the locking nail 2 continues being rotated, the tip 220 of the forcing section 22 can be moved into the location A (as shown in FIG. 4), and the conical face 221 of the forcing section 22 forces the paws 12 to expand outwardly, hence the paws 12 are urged against the bore of the wall so that the workpiece 3 is fixed on the wall securely by the fixing bolt.

Figure 6:
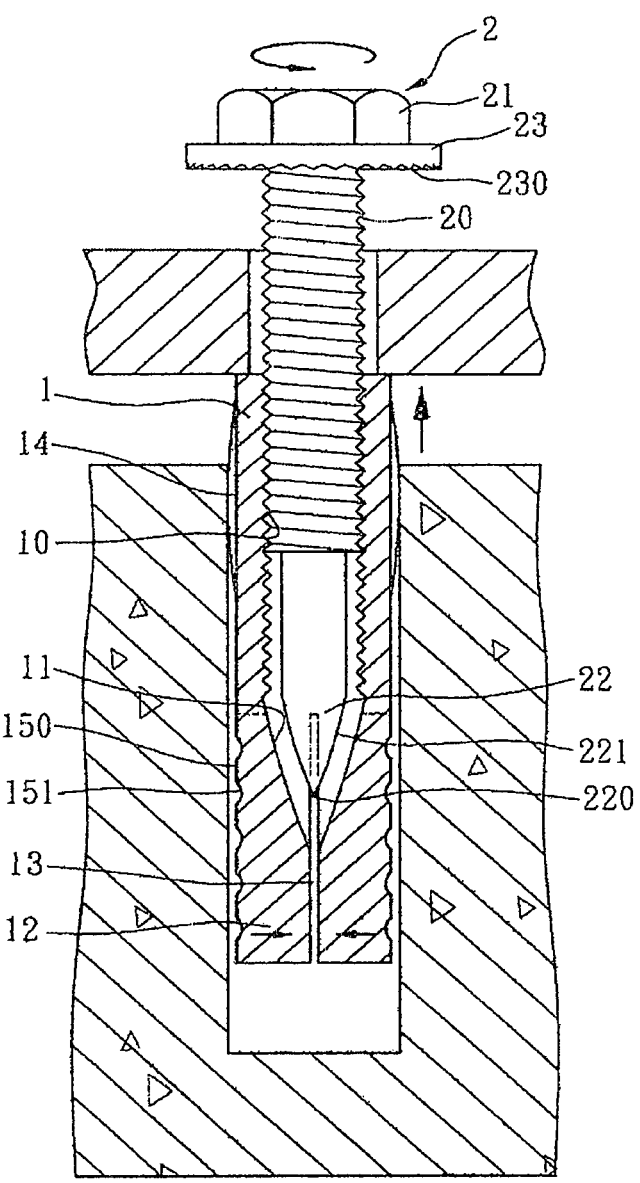
FIG. 6 is another cross sectional view of the fixing bolt according to the preferred embodiment of the present invention, wherein the fixing bolt being uninstalled from the bore is demonstrated.
Figure 7:
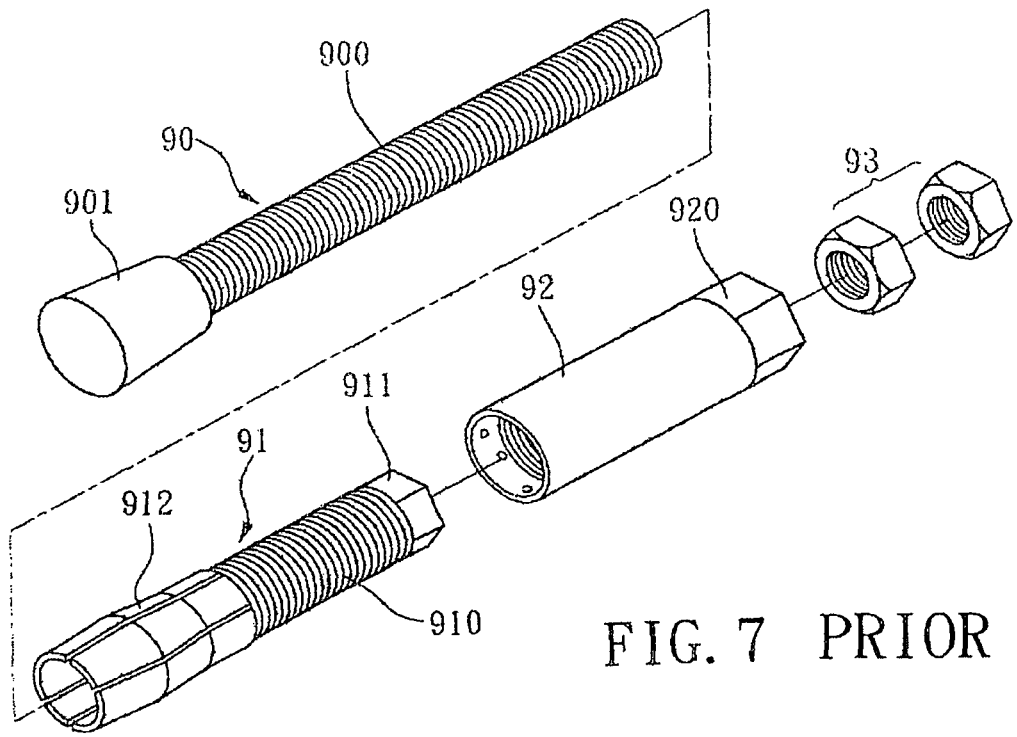
FIG. 7 is a perspective view showing exploded components of a conventional fixing bolt.
Figure 8:
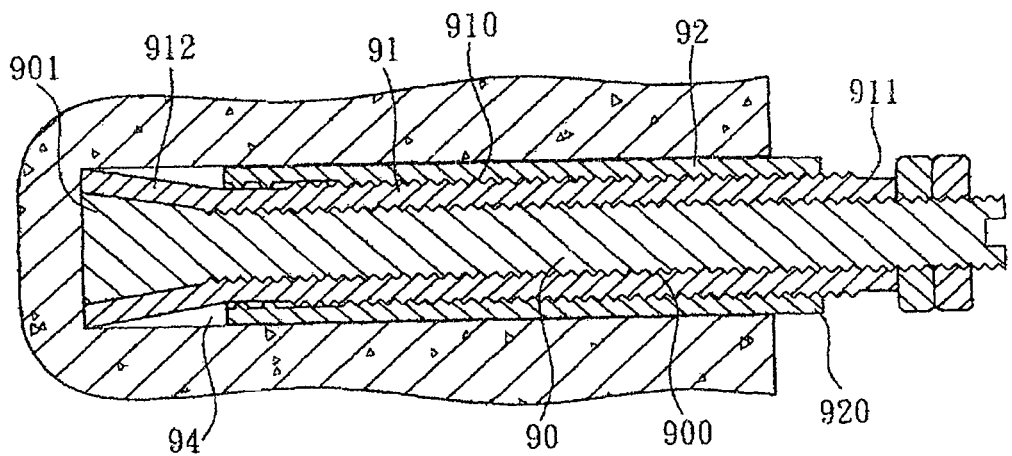
FIG. 8 is a cross sectional view of the conventional fixing bolt.

Referring to FIG. 6, when the locking nail 2 is rotated in a reverse direction, the forcing section 22 of the locking nail 2 can move away from the conical hole 11, and thus the paws 12 of the flexible sleeve 1 can return to its original, unexpanded condition, so that the fixing bolt can be taken out from the bore.

As a summary, the fixing bolt of the present invention is advantageous in features: simple structure leading to a lower manufacturing cost; easy and quick operation, including installation and uninstallation of the bolt.

While the preferred embodiment of the invention has been set forth for the purpose of disclosure, modifications of the disclosed embodiment of the invention may be made by those skilled in the art without departing from the scope of the invention.

What is claimed is:

1. A fixing bolt comprising:
a flexible sleeve defining a passage that runs through an upper portion of the flexible sleeve and terminates at a conical hole located at a lower portion of the flexible sleeve and tapering into a point located at a central axis of the flexible sleeve, wherein an internal threaded section is formed on an inner surface of the flexible sleeve that defines the passage, above the conical hole, multiple annular protrusions are formed on the lower portion of the flexible sleeve, multiple projected wings are formed on the upper portion of the flexible sleeve, and a plurality of slits are defined at the lower portion of the flexible sleeve to communicate with the conical hole of the passage, and extend across the multiple annular protrusions to be joined at the central axis of the flexible sleeve, below the conical hole, so that the lower portion of the flexible sleeve is formed into a plurality of paws, which are divided by the slits;
a locking nail including an external threaded section configured to be in threaded engagement with the internal threaded section of the flexible sleeve, a driving head formed on a first end of the locking nail, and a forcing section formed on a second end of the locking nail, the forcing section including a cylindrical portion immediately following the external threaded section, and a conical portion immediately following the cylindrical portion, the forcing section being configured to have a length less than each of the slits;
whereby, when the locking nail is rotated, the forcing section moves into or from the conical hole of the flexible sleeve so as to outwardly expand or inwardly retract the paws of the flexible sleeve, thus anchoring or de-anchoring the flexible sleeve.

2. The fixing bolt as claimed in claim 1, wherein the driving head has a circular stop tab formed on a bottom thereof, and the circular stop tab has a rugged surface formed on a bottom thereof.

3. The fixing bolt as claimed in claim 1, wherein the conical portion of the forcing section of the locking nail tapers into a tip.

* * * * *